United States Patent [19]

Steudler, Jr.

[11] 3,730,565
[45] May 1, 1973

[54] QUICK CONNECT-DISCONNECT COUPLER
[75] Inventor: Frederick W. Steudler, Jr., Lancaster, Pa.
[73] Assignee: The Vallorbs Jewel Company, Lancaster, Pa.
[22] Filed: Feb. 29, 1972
[21] Appl. No.: 230,387

[52] U.S. Cl. ................285/158, 285/197, 285/360, 285/DIG. 16
[51] Int. Cl. ............................................F16l 41/00
[58] Field of Search .....................285/360, 361, 376, 285/396, 197, 158

[56] References Cited
UNITED STATES PATENTS

| 242,564 | 6/1881 | Sholder | 285/360 X |
|---|---|---|---|
| 1,549,858 | 8/1925 | Evans | 285/361 X |
| 2,241,773 | 5/1941 | Ernolf | 285/360 X |
| 176,769 | 5/1876 | Bradley | 285/360 |
| 1,193,446 | 8/1916 | Wells | 285/361 X |
| 3,538,950 | 11/1970 | Porteners | 285/376 X |
| 1,309,830 | 7/1919 | Wanamaker | 285/376 X |
| 3,232,644 | 2/1966 | Pfeifer et al. | 285/361 X |
| 2,736,335 | 2/1956 | Webber | 285/197 X |
| 3,649,055 | 3/1972 | Nilsen | 285/197 |

FOREIGN PATENTS OR APPLICATIONS

| 993,807 | 7/1951 | France | 285/376 |
|---|---|---|---|
| 625,461 | 8/1961 | Canada | 285/197 |

Primary Examiner—Thomas F. Callaghan
Attorney—Charles E. Brown et al.

[57] ABSTRACT

This disclosure relates to a coupler which can be quickly connected and disconnected, the coupler being defined by male and female elements adapted to be joined together by relative and successive axial and rotational movement, the female element and male element in the assembled position thereof having opposing annular shoulders between which is received a gasket, and cooperative means for axially moving the shoulders toward each other upon relative rotation of the male and female elements whereby the gasket is compressed to form a seal between the elements. Movement is imparted to the shoulders by a radially directed lug of the male element which functions as a cam follower by moving along an annular end surface of the female element which in addition to being inclined circumferentially has a plurality of lands and valleys with the latter interlocking with the lug to selectively vary the distance between the shoulders and thus the degree which the gasket may be compressed.

9 Claims, 3 Drawing Figures

PATENTED MAY 1 1973  3,730,565

QUICK CONNECT-DISCONNECT COUPLER

This invention is directed to coupling means which can be rapidly assembled and disassembled, are of a simple, foolproof, inexpensive construction, and offer a high degree of versatility for use in a number of environments. The coupling means or coupler includes a female element in the form of a sleeve having an annular shoulder opposing an annular shoulder of a male element with an annular gasket being disposed between the shoulders. An end face of the sleeve is inclined circumferentially and therealong moves a radially outwardly directed lug of the male element whereby the annular shoulders are moved toward each other to vary the compressibility of the gasket and thus in effect alter as desired the sealing force between the male and female elements. The latter advantage is highly desirable for many reasons as, for example, in high pressure liquid distribution systems a greater sealing force to prevent leakage is desired as compared to, for example, similar though low pressure or no pressure applications. Likewise, depending upon the material from which the female and male elements are formed the coupling force should be varied to an extent permitting maximum efficiency in the absence of material failure as might occur if the clamping or locking force could not be varied. In situations involving electrical installations where it is simply a question of precluding contaminants (moisture) from adversely affecting electrical conductors the coupling force need not be excessively high.

It is also desirable once a desired clamping force is achieved to make certain that it is maintained, and this objective is achieved by the present invention by providing the annular end face of the sleeve with alternating peaks and valleys, the valleys serving as stops or locating means for the lug of the male element to maintain it seated selectively in any one of the valleys thus altering the clamping force between the male and female elements.

Still another object of this invention is achieved by means permitting the rapid assembly of the male and female elements, the latter means being an axial slot in the interior surface of the sleeve passing through its shoulder through which the lug may freely pass yet which is sealed by the gasket after relative rotation between the male and female elements thus achieving rapid connection and disconnection therebetween.

With the above and other objects in view that will hereinafter appear, the nature of the invention will be more clearly understood by reference to the following detailed description, the appended claimed subject matter, and the several views illustrated in the accompanying drawing.

IN THE DRAWING

Figure 1:
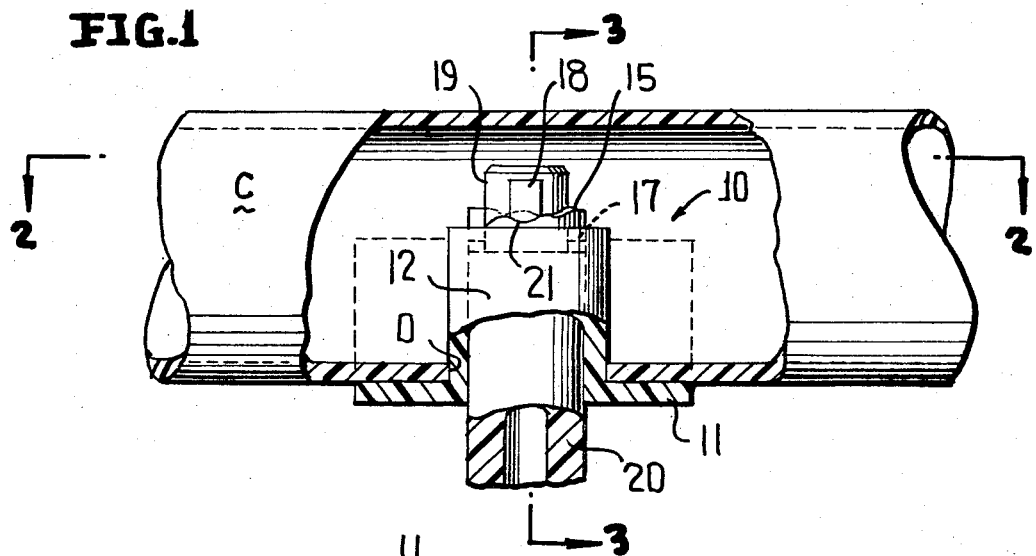
FIG. 1 is a fragmentary sectional view of a novel coupling constructed in accordance with this invention, and illustrates the male and female elements in assembled relationship with a gasket compressed between shoulders thereof.

The novel coupler or coupling means of this invention is generally designated by the reference numeral 10 and is shown in the drawing associated with a conduit C which may be, for example, a water pipe, a gas pipe, a conduit through which electrical conductors (not shown) may pass, or any similar structure to which it is desired to connect the coupler 10.

The coupler 10 includes a saddle-like portion 11 which may be adhesively secured to the conduit C after a sleeve 12 thereof has been introduced through a circular opening O formed in the conduit C. Though mention is made of adhesively securing the saddle-like portion 11 to the conduit C, it is to be appreciated that any means whatever may be employed as, for example, providing threads in the exterior surface of the sleeve 12 which, in the absence of the saddle 11, could simply be screw threaded in corresponding threads (not shown) formed in the opening O. The sleeve 12 further includes a radially inwardly directed flange 17 having an inner cylindrical surface 14 and upwardly and downwardly oppositely facing axial surfaces, walls or faces 15, 16, the former of which is of an undulating configuration progressively inclining upwardly in a circumferential direction from an axial slot 25 formed in the cylindrical surface 14 of a sufficient depth and width to freely axially pass therethrough a lug 18 of an end portion 19 of a male element 20 with the lug 18 having a rounded surface 21 opposing the face 16 of the sleeve 12. The lug 18 is in axial spaced relationship to an annular wall or face 22 which receives in sandwiched relationship with the annular wall 16 an O-ring gasket or seal 23.

Figure 2:
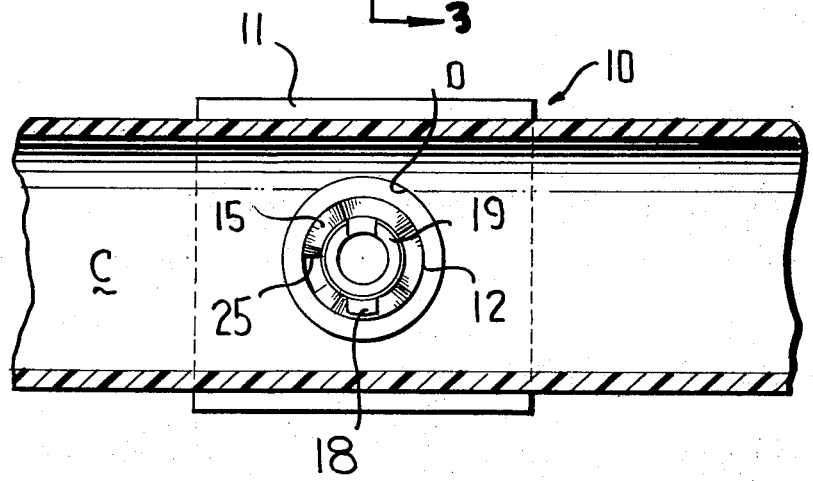
FIG. 2 is a sectional view taken generally along line 2—2 of FIG. 1, and illustrates an axial slot in the interior surface of the coupler sleeve through which the lug of the male element passes upon relative axial movement during coupling and uncoupling operations.
Figure 3:
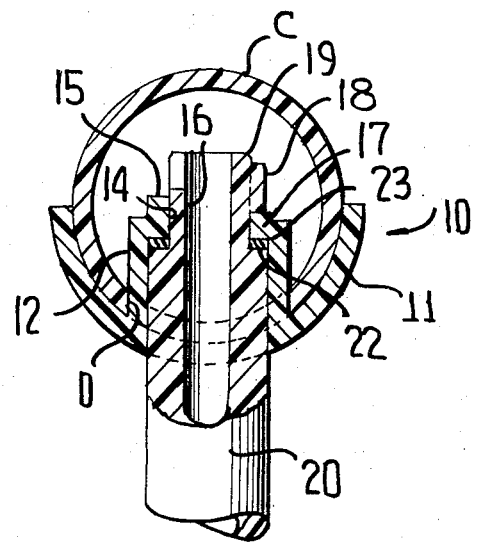
FIG. 3 is an axial sectional view taken through the coupler of FIG. 1 along line 3—3, and illustrates the manner in which a lug of the male element rests in a valley of a circumferentially inclined end surface of the female element to both lock the elements together and vary the clamping force upon the gasket.

Assuming that the conduit C and the coupling means 10 are totally disassembled, the same are assembled by first forming the opening O in the conduit C by simply drilling or boring the same in a conventional manner which can be quickly done since the conduit C is preferably constructed from plastic material. Thereafter, the seat or saddle-like portion 11 is adhesively secured to the conduit C with the sleeve 12 disposed interiorly thereof by simply being inserted through the opening O. The O-ring gasket 23 is next seated upon the shoulder or wall 22 of the end portion 19 of the male element 20 and the end portion 19 is introduced axially into the sleeve 12 with the lug 18 in alignment with the slot 25. Upon axial relative movement the lug 18 passes through the slot 25 and upon being rotated clockwise in FIG. 2 and counterclockwise in FIG. 2 the lug 18 will progressively ride upwardly along the surface 15 drawing the surfaces 16, 22 closer together thus compressing the O-ring gasket 23 and assuring not only a tight connection but a sealed connection with the undulations of the face 15 permitting the coupling forces to be varied as may be found necessary due to component tolerances and to, of course, achieve the advantages heretofore noted. Valleys (unnumbered) of the face 15 are contoured to match the under surface (unnumbered) of the lug 18 thus assuring an interlock irrespective of which valley the lug 18 is selectively seated. The lug 18 is held in the associated valley by, of course, the natural resilience of the O-ring gasket 23 which continuously urges the lug 18 downwardly.

While preferred forms and arrangements of parts have been shown in illustrating the invention, it is to be clearly understood that various changes in details and arrangement of parts may be made without departing from the spirit and scope of this disclosure.

I claim:

1. Coupling means comprising cooperative male and female elements adapted to be coupled together by relative and successive axial and rotational movement, said female element includes a saddle-like portion having a surface adapted to at least partially embrace a conduit, said female element includes a tubular portion of a size to receive said male element, said tubular portion projects away from said saddle-like portion surface and in the same facing direction thereof thereby being adapted for insertion into a transverse opening of a conduit, means defining an annular shoulder on each element, said shoulders being in axially opposed relationship, resilient gasket means seated between said shoulders, cooperative means for axially moving said shoulders toward each other upon relative rotation of said elements toward the coupled position thereof, said cooperative means are cam and cam follower means of said female and male elements respectively, said cam means is defined by a terminal annular end surface of said tubular portion most remote from said saddle-like portion and facing in an axial direction away from saddle-like portion, and said terminal annular end surface is inclined circumferentially whereby said annular shoulders are moved axially with said gasket therebetween being compressed to form a seal between said male and female elements in the coupled condition thereof.

2. The coupling means as defined in claim 1 wherein said female element includes means for passing said cam follower means axially through the shoulder of said female element.

3. The coupling means as defined in claim 1 wherein said cam means further includes means for selectively adjusting the distance between said shoulders thereby selectively vary the compression of said gasket.

4. The coupling means as defined in claim 2 wherein said passing means is an axial slot in said female element opening radially toward the axis of said female element.

5. The coupling means as defined in claim 3 wherein said adjusting means are valleys between alternating peaks and valleys of said terminal annular end surface.

6. The coupling means as defined in claim 1 wherein said female element includes means for passing said cam follower means axially through the shoulder of said female element, and said cam means further includes means for selectively adjusting the distance between said shoulders thereby selectively vary the compression of said gasket.

7. The coupling as defined in claim 6 wherein said passing means is an axial slot in said female element opening radially toward the axis of said female element.

8. The coupling means as defined in claim 6 wherein said adjusting means are valleys between alternating peaks and valleys of said terminal annular end surface.

9. The coupling means as defined in claim 7 wherein said adjusting means are valleys between alternating peaks and valleys of said terminal annular end surface.

* * * * *